US011026154B2

(12) United States Patent
Nicholls et al.

(10) Patent No.: US 11,026,154 B2
(45) Date of Patent: Jun. 1, 2021

(54) BEACONED WIRELESS NETWORK

(71) Applicant: SALUNDA LIMITED, Oxfordshire (GB)

(72) Inventors: Grant Nicholls, Hampshire (GB); Philip Samuel Pickles, Oxfordshire (GB); Andrew Henry John Larkins, Berkshire (GB); John Mark Newton, Oxfordshire (GB)

(73) Assignee: SALUNDA LIMITED, Oxfordshire (GB)

( * ) Notice: Subject to any disclaimer, the term of this patent is extended or adjusted under 35 U.S.C. 154(b) by 0 days.

(21) Appl. No.: 16/633,877

(22) PCT Filed: Jul. 11, 2018

(86) PCT No.: PCT/GB2018/051975
§ 371 (c)(1),
(2) Date: Jan. 24, 2020

(87) PCT Pub. No.: WO2019/020972
PCT Pub. Date: Jan. 31, 2019

(65) Prior Publication Data
US 2020/0169942 A1    May 28, 2020

(30) Foreign Application Priority Data

Jul. 27, 2017  (GB) ..................................... 1712136
Sep. 21, 2017  (GB) ..................................... 1715267

(51) Int. Cl.
*H04W 40/24* (2009.01)
*H04L 1/18* (2006.01)
(Continued)

(52) U.S. Cl.
CPC ......... *H04W 40/244* (2013.01); *H04L 1/1867* (2013.01); *H04W 40/22* (2013.01);
(Continued)

(58) Field of Classification Search
CPC ............... H04W 40/244; H04W 40/22; H04W 72/0446; H04W 84/18; H04W 74/006;
(Continued)

(56) References Cited

U.S. PATENT DOCUMENTS 7,486,631 B2 *   2/2009  Mulligan .......... H04W 72/1263
                                                         370/311
2008/0291855 A1  11/2008  Bata et al.
(Continued)

FOREIGN PATENT DOCUMENTS

CN         204010294 U      12/2014
WO     WO-2005/076545 A1     8/2005
(Continued)

OTHER PUBLICATIONS

International Search Report and Written Opinion of International Searching Authority for Application No. PCT/GB2018/051975, dated Nov. 28, 2018.
(Continued)

*Primary Examiner* — Afshawn M Towfighi
(74) *Attorney, Agent, or Firm* — Marshall, Gerstein & Borun LLP (57) ABSTRACT

A wireless network comprises nodes, including routers having a tree-shaped communication topology and end devices, communicate in accordance a network protocol, wherein the routers transmit beacons in respective timeslots within a periodic beaconing interval, passively scan for messages, and, in response to receiving a message, transmit an acknowledgement thereof the received message. An end device that has a message that is pending transmission, passively scans for beacons transmitted from any router; and in response thereto, transmits the message, and passively scans for an acknowledgement, repeating those steps if no acknowledgement is received. This provides responsivity in
(Continued)

an environment having rapidly changing propagation paths. To reduce power consumption, the end devices do not passively scan for beacons except when they have a message that is pending transmission, and also at predetermined times for reception of a downstream message. When radio silence is required, the routers do not transmit beacons.

16 Claims, 6 Drawing Sheets

(51) Int. Cl.
  *H04W 40/22* (2009.01)
  *H04W 72/04* (2009.01)
  *H04L 12/44* (2006.01)
  *H04W 84/18* (2009.01)
(52) U.S. Cl.
  CPC ......... *H04W 72/0446* (2013.01); *H04L 12/44* (2013.01); *H04W 84/18* (2013.01)
(58) Field of Classification Search
  CPC .............. H04W 52/0219; H04W 48/10; H04L 1/1867; H04L 12/44; H04L 1/188; H04L 1/12; Y02D 30/70
  See application file for complete search history.

(56) References Cited

U.S. PATENT DOCUMENTS

| | | | |
|---|---|---|---|
| 2009/0016314 A1* | 1/2009 | Kim | ................. H04W 72/1257 370/345 |
| 2010/0080156 A1 | 4/2010 | Nichols et al. | |
| 2010/0195557 A1 | 8/2010 | Aoki | |
| 2015/0030011 A1* | 1/2015 | Liu | .......................... H04J 3/16 370/336 |
| 2016/0037449 A1* | 2/2016 | Kandhalu Raghu | .. H04W 72/12 370/311 |

FOREIGN PATENT DOCUMENTS

| | | |
|---|---|---|
| WO | WO-2008/088190 A1 | 7/2008 |
| WO | WO-2009/088190 A1 | 7/2009 |
| WO | WO-2018/087511 A1 | 5/2018 |

OTHER PUBLICATIONS

Bernhard et al., "Timing synchronization of low power wireless sensor nodes with largely differing clock frequencies and variable synchronization", 2015 IEEE 20th Conference on Emerging Technologies & Factory Automation (EFTA), IEEE, Sep. 8, 2015, pp. 1-7.

* cited by examiner

| Version number – bit field of the version | Length – of the payload | Checksum of payload | Payload |
|---|---|---|---|
| 1 byte | 1 byte | 1 byte | n bytes |

Fig. 9

| Length – of the payload | Checksum of payload | Source | Destination | First hop beacon slot for debug | First hop LQI for debug | TTL | Hop count | Payload |
|---|---|---|---|---|---|---|---|---|
| 1 byte | 1 byte | 8 bytes | 8 bytes | 1 byte | 1 byte | 1 byte | 1 byte | n bytes |

Fig. 10

| Length – of the payload | Data type | Payload |
|---|---|---|
| 1 byte | 1 byte | N bytes |

Fig. 11

| Version Header | Payload | |
|---|---|---|
| | Data Header | Payload |
| | | Payload |

Fig. 12

| Version Header | Payload | | |
|---|---|---|---|
| | Routing Header | Payload | |
| | | Data Header | Payload |
| | | | Payload |

Fig. 13

BEACONED WIRELESS NETWORK

CROSS-REFERENCE TO RELATED APPLICATIONS

The present application is the United States national phase of International Patent Application No. PCT/GB2018/051975, filed Jul. 11, 2018, which claims priority to Great Britain Application Nos. 1712136.9, filed Jul. 27, 2017, and 1715267.9, filed Sep. 21, 2017. The priority applications are hereby incorporated by reference.

BACKGROUND

The present invention relates to a wireless network allowing end devices to transmit messages by wireless communication.

SUMMARY

A first aspect of the present invention is concerned in particular with a network that is designed to provide a reliable and responsive transmission messages from end devices in an environment having propagation paths for wireless transmission that are liable to change within a typical timescale between the transmission of messages, while minimising the power requirements of end devices. These factors put contradictory constraints on the network and are difficult to balance.

Merely by way of example, an application where a relatively high degree of reliability and responsivity for upstream transmission of messages from end devices is required is where the end devices include a sensor unit for sensing a parameter that needs to be communicated with low latency. In such applications, communication may be needed for reasons of safety or to provide monitoring of machinery. For example, the sensor unit may sense the rotational position of a respective rotatable element which needs to be communicated with low latency.

An application where end devices include a sensor unit are also typically an example where it is desirable to minimise the power requirement of the end devices. For example in such examples the end device may have a power source of limited capacity, for example a battery. Besides a need for communication with low upstream latency, responsivity may be helpful in reducing the power consumption of the end device, by limiting the transmission time of the end device.

These requirements are difficult to meet in an environment where propagation paths for wireless transmission are liable to change. In general terms this may include environments where the end devices and/or metallic and other objects move in a manner that effects the propagation path. Example of such environments include typical marine environments, e.g. on a ship or other vessel or platform, in a facility in the oil and gas industry or in a factory. In such environments, it is known for an association for point-to-point communication between an end device and a router to be adapted in response to reception quality. However, such adaptation generally involves ongoing monitoring of reception quality and communication between the end point and the routers in a manner that increases power consumption According to a first aspect of the present invention, there is provided a wireless network comprising a plurality of nodes including plural routers and plural end devices, which nodes each include a wireless interface for wireless communication, the nodes of the network being arranged to communicate in accordance a network protocol, in accordance with which: the routers transmit beacons in respective timeslots within a periodic beaconing interval, passively scan for messages, and, in response to receiving a message, transmit an acknowledgement of the received message; and when an end device has a message that is pending transmission, the end device (a) passively scans for beacons transmitted from any router; and (b) in response to receiving a beacon, transmits the message, and passively scans for an acknowledgement, the end device repeating steps (a) and (b) if no acknowledgement is received.

As the end device passively scans for beacons transmitted from any router when it has a message that is pending transmission, and transmits the message in response thereto, the end device does not need to take account of changing propagation paths that may change the router with which it is capable of communicating. This may be thought of as the end device being associated with the network as a whole rather than with a particular router within the network. In particular, it is not necessary for the end device to monitoring of reception quality and to adapt an association with particular routers. This minimises power consumption, because the end device only needs to scan and transmit when it actually has a message that is pending transmission.

Furthermore, reliability is achieved by the transmission of an acknowledgement from routers to the end device in response to reception of a message, the end devices continuing to transmit the message if no such acknowledgement is received. Thus, even in the event that propagation paths for wireless transmission have changed within a typical timescale between the transmission of messages, reliable and responsive transmission is achieved.

For example, the end devices may be arranged not to passively scan for beacons except when they have a message that is pending transmission, and optionally also at predetermined times for reception of a downstream message.

Advantageously, the end device may transmit the message in the timeslot of the received beacon, and the routers may passively scan for messages in the respective timeslot of their own beacon. Similarly, the routers may transmit an acknowledgement of the received message in the timeslot of their own beacon, and the end device may passively scan for an acknowledgement in the timeslot of the received beacon. As such, the communication of a message and/or acknowledgment occurs between an end device and a router within a particular timeslot, so the routers do not need to scan for messages at other times which reduces the power consumption of the routers and also contention is reduced.

A second aspect of the invention is concerned with a network that is capable of operation in an environment where radio silence is at times required. Radio silence may be required for safety reasons, for example in environments where there are times at which wireless transmission may create a danger, or for reasons of needing the wireless channel clear for other communications such as a distress signal. By way of example, the environment may be subject at times to a potentially explosive atmosphere that wireless transmissions create a risk of igniting. Example of such environments include typical marine environments, e.g. on a ship or other vessel or platform, in a facility in the oil and gas industry or in a factory.

According to the second aspect of the present invention, there is provided a wireless network comprising a plurality of nodes including plural routers and plural end devices, which nodes each include a wireless interface for wireless communication, the nodes of the network being arranged to communicate in accordance a network protocol, in accordance with which: the routers transmit beacons in respective timeslots within a periodic beaconing interval, and passively scan for messages in response thereto, except that in response to a determination that radio silence is required, the routers are arranged not to transmit beacons; and the end devices passively scan for beacons and transmit messages in response thereto.

As end devices passively scan for beacons and transmit messages in response thereto, the cessation of transmission of beacons also causes cessation of transmission by the end devices. Thus, cessation of transmission of beacons in response to a determination that radio silence is required is used to cause radio silence from the entire network.

The first and second aspects of the present invention may be combined together. Thus, in the first aspect of the invention, in response to a determination that radio silence is required, the routers may be arranged not to transmit beacons.

The following features of the network may be applied to either of the first or second aspects of the invention, or to the combination thereof.

The routers may include a coordinator and plural gateway routers, in which case the gateway routers transmit messages they receive to the coordinator.

In one example, the coordinator may transmit a beacon in an initial timeslot and each gateway router may passively scan for a beacon transmitted from another router, and transmits a beacon in its respective timeslot only in response to receiving a beacon with a predetermined period prior thereto.

In this manner, cessation of transmission of a beacon by the coordinator causes cessation of transmission of beacons by the other routers and hence cessation of transmission by the end devices. This may be used to provide radio silence. That is, in response to a determination that radio silence is required, the coordinator may be arranged not to transmit a beacon in the initial timeslot, whereby the gateway routers are caused also not to transmit beacons.

The routers have a tree-shaped communication topology comprising a first layer of gateway routers that are each associated to the coordinator and optionally one or more further layers of gateway routers that are each associated to a gateway router in a lower layer. Thus, in contrast to the end devices, the routers may negotiate an association.

In this case, the gateway routers may transmit messages they receive to the router to which they are associated.

Similarly, when a gateway router has a message that is pending transmission, the gateway router may, in response to receiving a beacon from the router to which it is associated, transmit the message in the timeslot of the received beacon, and passively scans for an acknowledgement, the gateway router repeating that transmission if no acknowledgement is received.

Also, each gateway router may passively scan for a beacon transmitted from the router to which it is associated, and transmits a beacon in its respective timeslot only in response to receiving a beacon from the router to which it is associated within a predetermined period prior thereto.

Both aspects of the present invention may be applied with advantage to end devices which each include a sensor unit for sensing the rotational position of a respective rotatable element, and are arranged to generate messages indicating the sensed rotational position. In many applications it is desirable to sense the orientation of a rotatable element, for example to provide safety during operation of the rotatable element. In the event of a mechanical failure or a failure in an actuation system for the rotatable element, which may be for example pneumatic, then the rotatable element might not be in the expected position which may create safety issues.

The end device may be mounted on the respective rotatable element. The sensor unit may comprise an orientation sensor that takes measurements that are dependent on the orientation of the sensor unit. Such measurements allow for a simple and reliable detection of the rotational position of the rotatable element. In particular, it allows the use of a type of sensor that is simpler than a typical external sensor with sufficiently reliable sensing. Similarly, the sensor unit may have a relatively low power consumption permitting use of an internal power source such as a battery. While such a sensor unit may be capable of being run for relatively long periods of time, it is desirable to minimise power consumption in order to extend lifetime.

According to further aspects of the present invention, there are provided methods of communication between nodes of a wireless network in which the nodes operate in a similar manner to the first and second aspects of the present invention.

According to yet further aspects of the present invention, there are provided routers and end devices capable of use within a network in accordance with the first and second aspects of the present invention.

BRIEF DESCRIPTION OF THE FIGURES

Embodiments of the present invention will now be described by way of non-limitative example with reference to the accompanying drawings, of which

DETAILED DESCRIPTION

Figure 1:
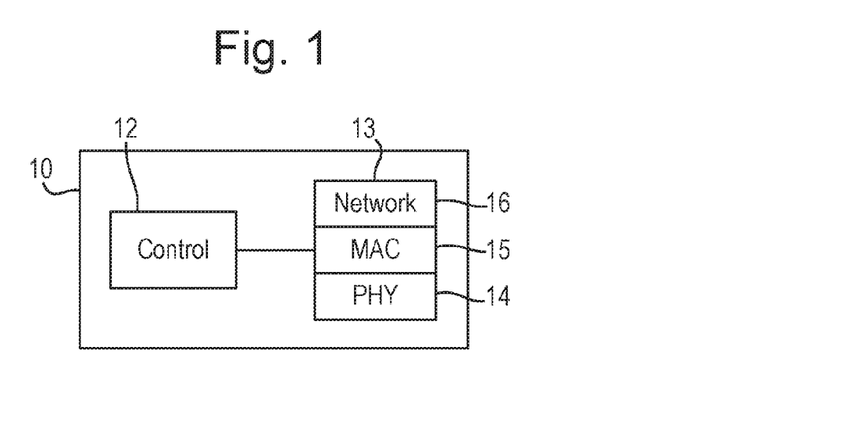
FIG. 1 is a schematic diagram of a gateway router.

FIG. 1 shows a gateway router 10 including a control unit 12 and a wireless interface 13. The control unit 12 controls the gateway router 10 as a whole including the wireless interface 13 and may be formed by a processor executing an appropriate program. The wireless interface 12 comprises a physical (PHY) layer 14, a media access control (MAC) layer 15 and a network layer 16.

Figure 2:
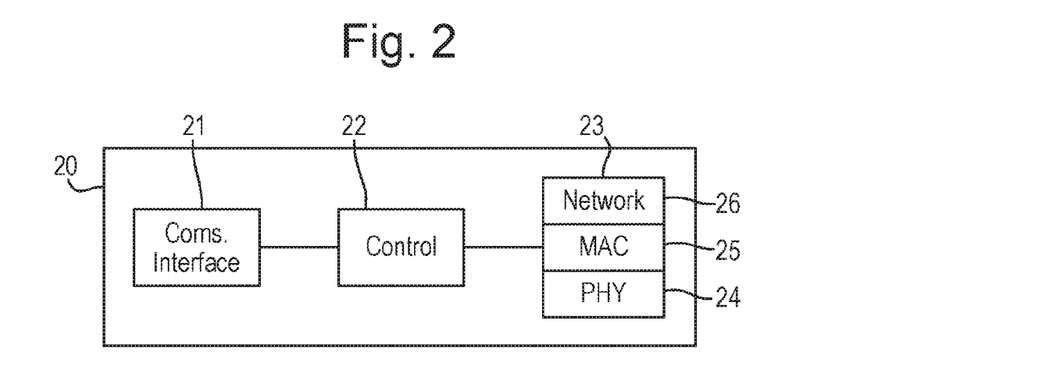
FIG. 2 is a schematic diagram of a gateway router.

FIG. 2 shows a coordinator 20 which may be referred to as a PAN (personal area network) coordinator. The coordinator 20 is a router having a similar construction as in the gateway router 10, including a control unit 22 and a wireless interface 23, that includes a physical layer 24, a media access control layer 25 and a network layer 26, which are the same as the corresponding elements of the gateway router 10. The coordinator 20 also includes a communication interface 20 for communicating with an external computer system. The communication interface 20 may provide for example a wired interface, for example including an Ethernet link.

Figure 3:
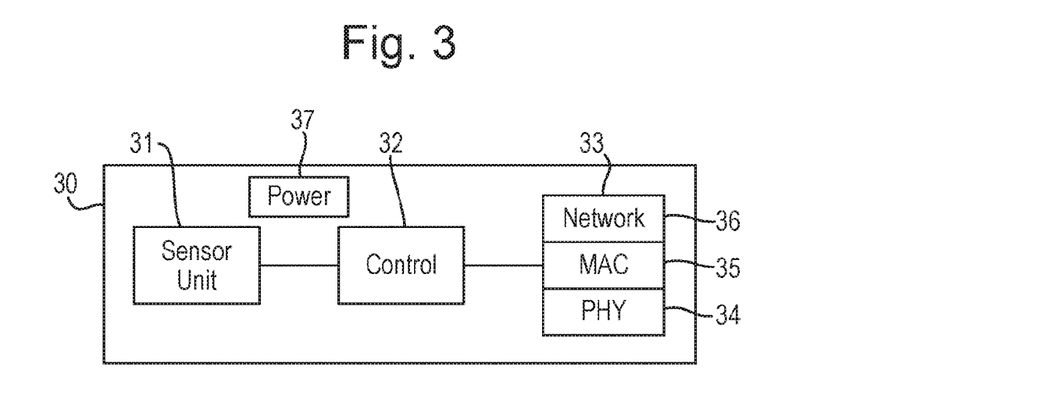
FIG. 3 is a schematic diagram of an end device.

FIG. 3 shows an end device 30 including a sensor unit 31, a control unit 32 and a wireless interface 33. Examples of the sensor unit 31 are described below. The control unit 32 controls the end device 30 as a whole including the wireless interface 33 and may be formed by a processor executing an appropriate program. The wireless interface 33 comprises a physical (PHY) layer 34, a media access control (MAC) layer 35 and a network layer 36. The end device 30 further includes a power source 37 which may be a battery.

The physical layers 14, 24 and 34 in the gateway router 10, coordinator 20 and end device 30 each include a radio frequency transceiver and handle the actual wireless transmission and reception over the physical channel. The physical layers 14, 24 and 34 may be arranged in accordance with the IEEE 802.15.4 technical standard which defines the operation of low-rate wireless personal area networks (LR-WPANs).

The media access control layers 15, 25 and 35 in the gateway router 10, coordinator 20 and end device 30 each enables the transmission of MAC frames through the use of the physical channel. The media access control layers 15, 25 and 35 may also be arranged in accordance with the IEEE 802.15.4 technical standard.

The network layers 16, 26 and 36 in the gateway router 10, coordinator 20 and end device 30 together implement a network protocol as described further below.

Figure 4:
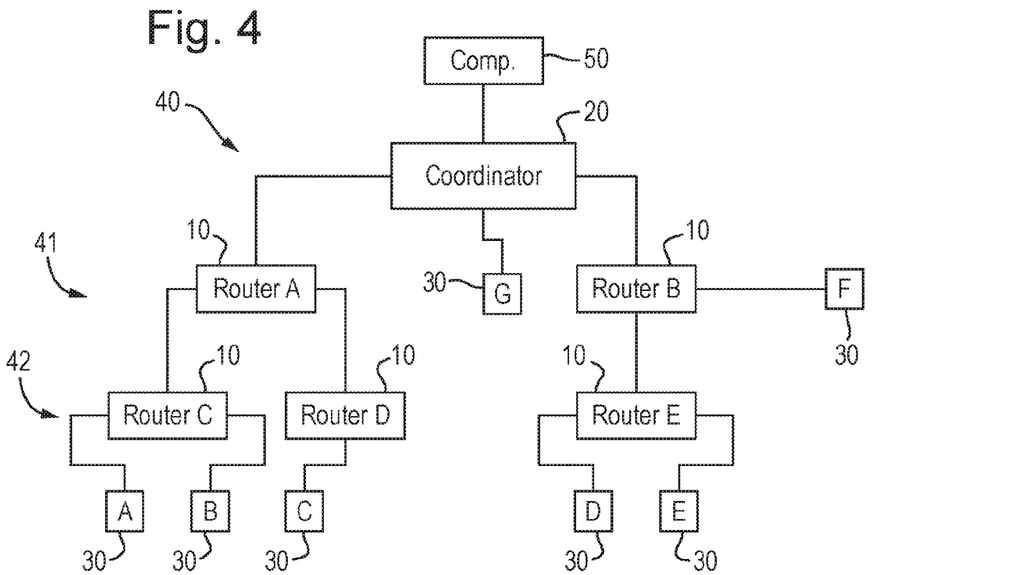
FIG. 4 is a diagram of a logical communication topology of a network.

A network 40, for example as shown in FIG. 4, is formed by a coordinator 20, plural gateway routers 10 and plural end devices 30 which each form a node of the network 40. The coordinator 20 communicates with a computer system 50 that is external to the network 40, using the communication interface 21. The computer system 50 may be a conventional computer running appropriate software.

In the network 40, the network protocol implemented by the network layers 16 and 36 in the gateway router 10, coordinator 20 and end device 30 provides for communication between these nodes of the network. The network protocol is designed to provide the following capabilities. The network protocol is designed to provide a reliable and responsive upstream transmission of messages from end devices 30 to the coordinator 20 in an environment having propagation paths for wireless transmission that are liable to change within a typical timescale between the transmission of messages. At the same time, the network protocol is designed to minimise the power requirements of the end devices 30, although the coordinator 20 and gateway routers 10 are not power constrained. The network protocol is also designed to be capable of providing rapid and robust radio silence in response to a determination that radio silence is required, for example for safety reasons or for reasons of needing the wireless channel clear for other communications. For example, the network 40 may be applied in a marine environments, e.g. on a ship or other vessel or platform, in a facility in the oil and gas industry or in a factory.

FIG. 4 shows the logical communication topology used by the network protocol in one particular example, by way of illustration.

In overview, the network 40 is arranged as follows. The coordinator 20 coordinates device that coordinates the whole network and transmits a beacon that schedules the base timing for all beacons, as described below. All communication outside of the network 40 is from the coordinator (which may also be referred to as a concentrator), i.e. through the communication interface 21. The gateway routers 10 transmit beacons and route messages in either direction between the end devices 30 and the coordinator 20. The end devices 30 transmit and receive messages but do not transmit beacons and do not route messages. The implementation of this will now be described in more detail.

The communication topology is tree-shaped, as follows. A first layer of gateway routers 10 are each associated to the coordinator 20. In the example of FIG. 4, the gateway routers 10 labelled Routers A and B form such a first layer 41. Furthermore, a further layers of gateway routers 10 are each associated to a gateway router 10 in a lower layer. In the example of FIG. 4, the gateway routers 10 labelled Routers C, D and E form a second layer 42, Routers C and D being associated to Router A, and Router E being associated to the gateway router 10 labelled Router A. Although not illustrated in the example of FIG. 4, further layers of gateway routers 10 could be formed, associated to the gateway routers 10 in the second layer 42. In general there may be any number of gateway routers 10 in each layer, but each gateway router 10 is associated as a child node to one parent node, being the coordinator 20 or a gateway router 10 in a lower layer.

All gateway routers 10 and the coordinator 20 passively scan all the time for the messages addressed to them. They do not implement any power saving.

The communication topology of the coordinator 20 and the gateway routers 10 is coordinated by the coordinator 20. The communication topology may be set based on reception qualities during an initialisation phase and static thereafter, or the communication topology may be dynamic based on ongoing monitoring of reception qualities.

In the example of the communication topology shown in FIG. 4, end devices 10 labelled A to G are shown as communicating with a single node, being the coordinator 20 or a gateway router 10. This illustrates different routes of communication for the end devices 10, but as described in more detail below it is a feature of the network protocol that end devices 10 may in fact communicate with any of the coordinator 20 or gateway routers 10.

The network 40 is a variation of a classical beaconed tree. Beacons are implemented as broadcast messages rather than beacons in accordance with the IEEE 802.15.4 technical standard. By way of illustration, FIG. 5 shows an example of the transmission and reception of beacons for the communication topology shown in FIG. 4.

The coordinator 20 and the gateway routers 10 transmit beacons at the start of respective timeslots 60 within a periodic beaconing interval 61, which might has a suitable length, for example 250 ms. The coordinator 20 transmits a beacon in an initial timeslot 60 which therefore schedules the beaconing interval 61. Each gateway routers 10 passively scans for a beacon transmitted from another router, which may be the coordinator 20 or a gateway router 10. Then, the gateways routers 10 transmits a beacon in their own respective timeslot only in response to receiving a beacon, so that their own beacons are scheduled on the basis of beacon from the coordinator 20.

In the example shown in FIG. 4, the coordinator 20 transmits a beacon in an initial timeslot 60 which is received by the gateway routers 10 labelled Routers A and B, but not the gateway routers 10 labelled C to E. Thus, the gateway routers 10 labelled Routers A and B transmit beacons in response to receiving the beacon from the coordinator 20, in the second and third timeslots 60, respectively. The gateway routers 10 labelled Routers C and D receive the beacon transmitted by the gateway router labelled Router A, so the gateway routers 10 labelled Routers C and D transmit beacons in response to that in the fourth and fifth timeslots 60, respectively. On the other hand, the gateway router 10 labelled Router E receives the beacon transmitted by the gateway router 10 labelled Router B, so the gateway router 10 labelled Router E transmits a beacons in response to that in the sixth timeslots 60, respectively.

Figure 5:
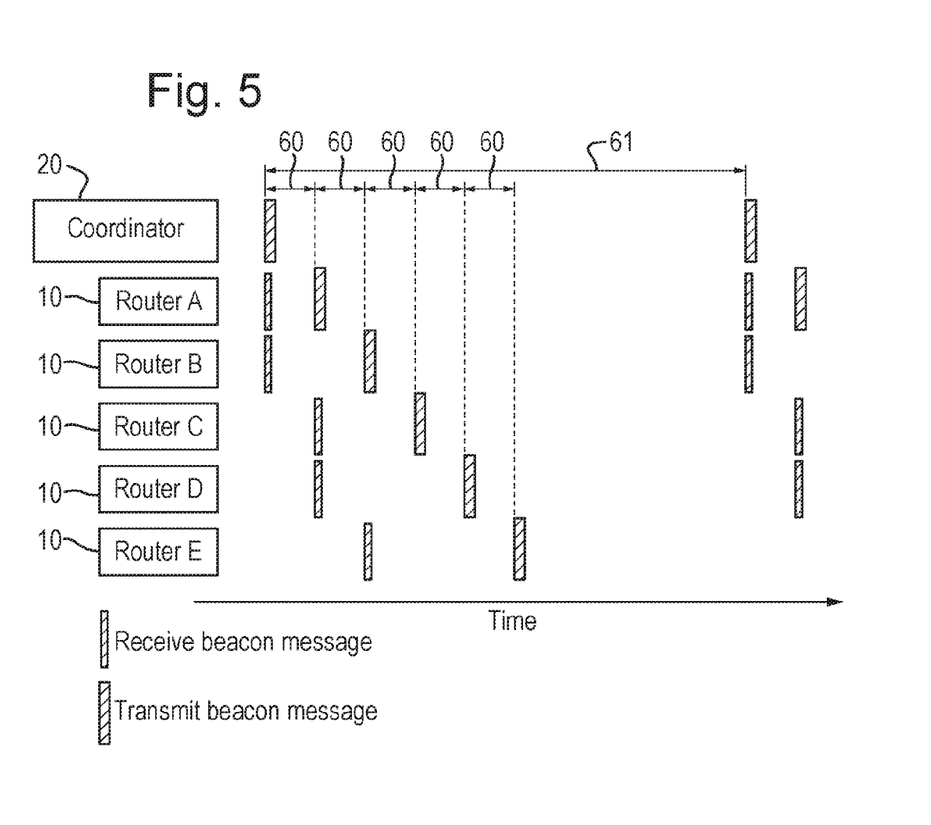
FIG. 5 is a timing diagram for beaconing in the network of FIG. 4.

FIG. 5 merely shows an example and in general the gateway routers 10 may receive more than one beacon and/or beacons from different nodes from those shown in FIG. 5.

In one type of implementation, the gateway routers 10 each passively scan for a beacon transmitted only in the timeslot 60 of the coordinator 20 or gateway router 10 to which it is associated, and transmit a beacon in its respective timeslot 60 only in response to receiving a beacon therefrom. In this example, the power consumption of the gateways routers 10 is reduced because it is not necessary to scan for beacons transmitted at other times.

In anther type of implementation, the gateway routers 10 passively scan for a beacon transmitted only any timeslot 60, and transmit beacons in their respective timeslots 60 only in response to receiving any beacon. This increases the robustness of the network 40 to failure of beaconing, for example in the event of changing propagation paths. That is at the expense of increased power consumption, but that may be of less concern for gateway routers 10, particularly if they can be located to receive power from an external power source.

With either of these types of implementation, the timing of the timeslots 60 for each gateway router 10 is set by the coordinator 20. This allows the coordinator 20 to provide the timeslots 60 at different timings to reduce contention. The timeslots 60 may be of equal or different duration.

In response to a determination that radio silence is required, the coordinator 20 ceases to transmit a beacon in the initial timeslot 60 and also does not respond to acknowledge any messages received. The computer system 50 generates the determination that radio silence is required and supplies it to the coordinator. The computer system 50 may generate the determination that radio silence is required based on user input, or based on analysis of data input from other sources. Such input data may be from a sensor system that monitors the environment around the network 40, for example indicating conditions where wireless transmission would be unsafe, such as a dangerously explosive atmosphere. Similarly, such input data may be from another wireless communication system, for example indicating that radio silence is needed to allow transmission of a distress signal.

The coordinator 20 ceasing to transmit a beacon in the initial timeslot 60 has the effect that the gateway routers 10 also do not transmit beacons their own transmission of beacons only occurs in response to receipt of a beacon. As discussed below, it also the case that end device 30 only transmit messages in response to receipt of a beacon. Thus, radio silence is achieved after a lag that depends on the number of layers of gateway routers 10 and the predetermined period used by the gateway routers 10 as discussed below.

The gateway routers 10 transmit a beacon in their own timeslot in response to receipt of a beacon with a predetermined period prior thereto. The predetermined period may be the length of the periodic beaconing interval 61 or may be longer. Use of a predetermined period provides some robustness to failure of transmission of beacons, but increases the lag in achieving radio silence after cessation of transmission of a beacon from the coordinator. Thus, the predetermined period is selected balancing these two factors, typically being two or small number of multiples of the length of the periodic beaconing interval 61.

Radio silence is ended by the coordinator 20 starting to transmit periodic beacons once again. This will be received by the gateway routers 10 and the network 40 will reform. Gateway routers 10 will then start transmitting regular beacons.

Health monitoring of the network 40 may be performed by the nodes transmitting messages on a regular basis. A suitable schedule might be that the coordinator 20 sends a message to the computer system 50 every 250 ms, the gateway routers 10 send a message to the computer system 50 every 5 seconds, and the end devices 30 send a message to the computer system 50 every 10 minutes. In that case, the computer system 50 may generate a network alarm if a message has not been received from the coordinator 20 for 1 second or a gateway router 10 for 11 seconds, in order to allow for one missed message before alarm. Similarly, the computer system 50 may generate a network alarm if a message has not been received from end devices 30 for several multiples of 10 minutes in order to provide for multiple retries to give high confidence for reception.

The operation of the end devices 30 will now be described.

The end devices 30 do not transmit beacons at all.

Periodically end devices 30 may generate messages for transmission. For example the message may indicate the output of the sensor unit 31, for example indicating the sensed rotational position in the case that the sensor unit 31 detects the rotational position of a rotatable element.

The end devices 30 handle upstream transmission of messages as follows. When the end device 30 has a message that is pending transmission, it passively scan for beacons.

Except when an end device 30 has a message that is pending transmission, and optionally also at predetermined times for reception of a downstream message as discussed below, the end devices 30 the end devices 30 do not passively scan and do not transmit messages, for example to negotiate association with the coordinator 20 or a gateway router 10. This minimises the power consumption of the end device 30 by reducing the amount of time the wireless interface 11 is operative.

On the other hand, this also means that in an environment having propagation paths for wireless transmission that are liable to change within a typical timescale between the transmission of messages, then the end device 30 might not be able to communicate with the coordinator 20 or gateway router 10 with which it previously communicated. To deal with this in a manner that also provides for a low upstream latency, the end devices 30 are not associated with a particular upstream node, but instead passively scan for beacons from any node, including the coordinator 20 or any gateway router 10, and similarly transmit the message that is pending transmission when they receive a beacon from any such node.

The coordinator 20 and gateway routers 10 scan for messages that are transmitted from end devices 30 in this way.

In a preferred implementation, the end device 30 transmits the message in the timeslot 60 of the received beacon.

In that case, the coordinator 20 and gateway routers 10 may scan for messages in the respective timeslots 60 of their own beacon, which reduces contention and avoids the need to scan for messages from end devices 30 at other times, thereby reducing power consumption. However, that is not essential. One alternative is that the end device 30 may transmit the message in response to the received beacon but at a different time, for example a random length of time after receipt of the received beacon, which increase the length of time that the coordinator 20 and gateway routers 10 perform passive scanning. Another alternative is that each of the coordinator 20 and gateway routers 10 passively scan for messages from any end device 30. This increases robustness, but requires the coordinator 20 and gateway routers 10 to perform passive scanning in each timeslot 60, as well as creating duplication of messages in the case that more than one node receives a message.

When the coordinator 20 or one of the gateway routers 10 receives a message, it transmits an acknowledgement of the received message. Similarly, the end device 30 passively scans for the acknowledgement. In the preferred implementation, in which the end device 30 transmits the message in the timeslot 60 of the received beacon, then the transmission of the acknowledgement and the passive scanning by the end device 30 also occur in the same timeslot 60.

If the end device 30 does not receive an acknowledgement, then the end device 30 repeats the steps of scanning for beacons, transmitting the message and scanning for an acknowledgement. This increases robustness, by repeating the process in the event of a failure of the upstream transmission.

Figure 6:
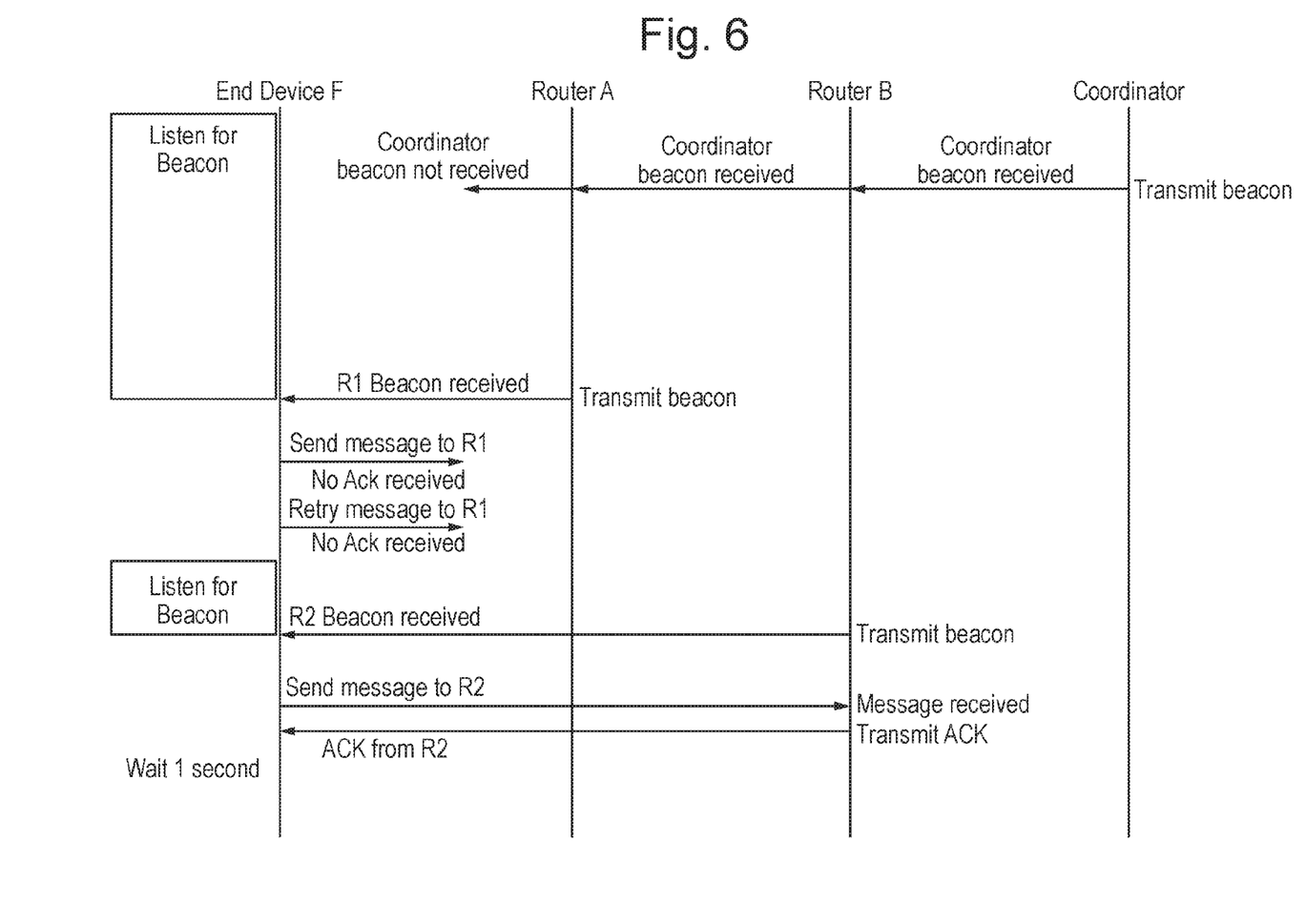
FIG. 6 is a diagram of communication associated with transmission of a message from an end node to a gateway router in the network of FIG. 4.

By way of illustration, FIG. 6 shows an example the process of transmitting beacons and messages from an end device for part of the network 40 shown in FIG. 4 comprising the gateway routers 10 labelled Routers A and B and the end device 30 labelled F. In this example, the end device 30 receives a beacon from both of the gateway routers 10 labelled Routers A and B, but there is initially a failure in transmission of the message. The following steps occur.

The coordinator 20 transmits a beacon in the initial timeslot 60.

The gateway routers 10 labelled Routers A and B receive the beacon from the coordinator 20 and transmit beacons in their respective timeslots 60.

The end device 30 does not receive the beacon from the coordinator 20 but does receive the beacons from the gateway routers 10 labelled Routers A and B.

In response to receiving the beacon from the gateway router 10 labelled Router A, the end device 30 transmits the message in the timeslot 60 of the gateway router 10 labelled Router A.

In this example, the message is not received by the gateway router 10 labelled Router A, so no acknowledgement is transmitted or received by the end device 30, which therefore repeats the process.

Accordingly, in response to receiving the beacon from the gateway router 10 labelled Router B, the end device 30 transmits the message again, but in the timeslot 60 of the gateway router 10 labelled Router B.

In this example, the message is received by the gateway router 10 labelled Router B, which in response transmits an acknowledgement. The acknowledgement is received by the end node 30 which then does not attempt to repeat transmission of that message. That is the end of the example illustrated in FIG. 6.

In the event of an end device 30 transmitting a message to a gateway router 10, rather than the coordinator 20, then further upstream transmission of messages occurs as follows to transmit the message to the coordinator 10. In particular, the gateway router 10 transmits the message to the router to which it is associated, which may be coordinator 20 or a gateway router 10 in a lower layer. In the latter case, the gateway router 10 in the lower layer repeats the process, this occurring through the layers until the message reaches the coordinator 20. The coordinator 20 transmits the message to the computer system 50 for handling in an appropriate manner, for example by display it to a user or activating an alarm.

Acknowledgments are used in a similar manner as for the transmission of messages from end devices 30. That is, the coordinator 20 and the gateway devices 10 passively scan for such messages and transmit an acknowledgement in response thereto. Similarly the gateway router 10 that has transmitted the message passively scans for the acknowledgement, and in the absence of receiving one, repeats the steps of transmitting the message in response to subsequently received beacons and scanning for an acknowledgement.

In the preferred implementation of the network 40, transmission of the message from the gateway router 10, as well as the transmission of an acknowledgement and the passive scanning therefor, occur in the timeslot 60 of the beacon received from the router to which it is associated, which may be coordinator 20 or a gateway router 10 in a lower layer.

Figure 7:
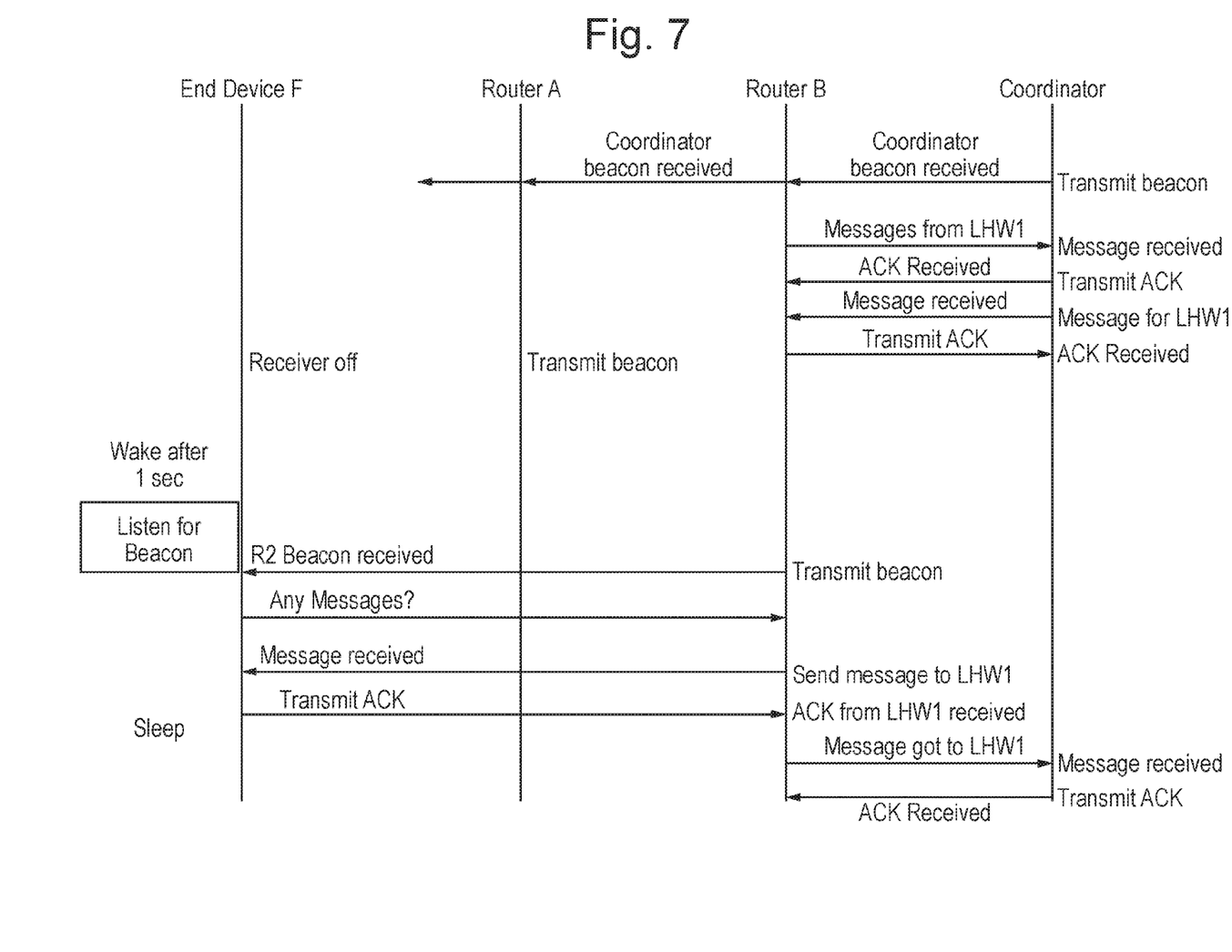
FIG. 7 is a diagram of communication associated with transmission of a message from a gateway router to the coordinator and of a message from the coordinator to an end node in the network of FIG. 4.

By way of illustration, FIG. 7 shows an example the process of transmitting messages upstream from a gateway router 20 for the same part of the network as the example of FIG. 6. In this example, the gateway router 10 labelled Router B has received a message and transmits it to the coordinator 20. The following steps occur.

As in FIG. 6, the coordinator 20 transmits a beacon in the initial timeslot 60, the gateway routers 10 labelled Routers A and B receive that beacon and transmit beacons in their respective timeslots 60.

In response to the beacon from the coordinator 20, the gateway router 10 labelled Router B transmits the message in the timeslot 60 of the coordinator 20.

In this example, the message is received by the coordinator 20, which in response transmits an acknowledgement. The acknowledgement is received by the gateway router 10 labelled Router B which then does not attempt to repeat transmission of that message.

The coordinator then also transmits a downstream message that is addressed to the end device 30.

The downstream message is received by the gateway router 10 labelled Router B, which in response transmits an acknowledgement to the coordinator 20. The coordinator 20 receives the acknowledgement and takes no further action.

The gateway router 10 labelled Router B which is the parent of the end device 30 stores the message and awaits a request from the end device 30.

The end device 30 is arranged after receipt of an acknowledgement (i.e. at the end of the example shown in FIG. 6) to sleep for a predetermined time, for example about 1 second, and then to perform passive scanning for reception of a downstream message, as follows. Specifically, the end device 30 passively scans for receipt of a beacon from the gateway router 10 labelled Router B, to which it previously transmitted the upstream message.

In response to receipt of a beacon from the gateway router 10 labelled Router B, the end device 30 transmits a message that is a poll request that requests messages.

The gateway router 10 labelled Router B, in response to receiving the poll request, transmits the message to the end device 30.

The end device 30, in response to receiving the message, transmits an acknowledgment to the gateway router 10 labelled Router B. The gateway router 10 labelled Router B, may retry the transmission a predetermined number of times in the absence of receiving the acknowledgement, but after successfully receiving the acknowledgment, transmits a message to the coordinator 20 indicating successful transmission to the end device 30.

The coordinator 20, in response to receiving the message indicating successful transmission to the end device 30, itself transmits an acknowledgment to the gateway router 10 labelled Router B. The gateway router 10 labelled Router B, may retry the transmission a predetermined number of times in the absence of receiving the acknowledgement. That is the end of the example illustrated in FIG. 7.

Some additional points about the operation of the gateway routers 20 are as noted follows. While the end devices 30 do not perform passive scanning for messages except after sending a request message, in the preferred implementation the gateway routers 20 (1) passively scan for messages from the parent node to which it is associated in the timeslot 60 for beacons of that parent node, which may the coordinator 20 or a gateway router 20 in a lower layer, and (2) passively scan for messages from end devices in the timeslot 60 of their own beacon. The end devices 30 similarly transmit messages in those timeslots. The destination of the messages is indicated by a routing table stored in the gateway router 10.

Any message received addressed to the coordinator 20 or another gateway router 10 is sent on immediately and may be subject to contention. However, all message transmission is subject to the restriction that messages are only be sent if a beacon has been received within the predetermined period.

Any message received addressed a end device 30 is stored by the gateway router 10 which is the parent of the end device 30 until it is requested by the end device 30 the next time it communicates with the gateway router 10.

Any message for a end device 30 that is not successfully transmitted within a predetermined window will be deleted.

Messages from a gateway router 10 for transmission upstream are put in a message queue and sent as soon as possible. This queue will operate on a first-in-first-out basis with the oldest message being sent first. If there are more than 10 items in the queue, the gateway router 10 will stop transmitting its beacon to stop additional upstream messages from end devices 30. The gateway router 20 may restart transmitting beacons when the queue has zero items. Any message that fails to be transmitted the first time will be subject to a retry with back off, for example with four immediate retries follows by retries every 100 ms to 150 ms later with random delay. If the oldest message is greater than 500 ms, no upstream message has successfully been communicated to its parent node in this time, so the gateway router 10 may stop transmitting beacons and search for an alternative parent. If any message in the queue is older than a predetermined age, for example 11 minutes, it may be deleted.

Installation of the network 40 may occur as follows. The installation process starts with installation of the coordinator 20. A unique network ID is set via the computer system 50. If single channel operation is desired the channel number is set. Gateway routers 20 and end nodes 30 are associated with the network 40 by transmission of an initialisation message. If this is a end device 30, it is identified by its serial number and allocated a sector, row and finger in a look-up table in the coordinator 20 and the end device 30 enters a normal operating mode. If it is a gateway router 10, it is allocated a timeslot and enters a normal operating mode.

In an initialisation mode, the gateway routers 20 and end nodes 30 may scan channels and transmit initialisation messages. On association with a network, the gateway routers 20 and end nodes 30 store the network ID and channel number, in a non-volatile manner that persists through watchdog reset, and thereafter will then only respond to that network ID and an emergency network ID The coordinator 20 can send a disassociate message to any gateway router 20 or end node 30 in the network 40, which then deletes the network ID and may return to an initialisation mode.

Addressing of the gateway routers 20 and end nodes 30 in the network 40 may be performed using long addresses of 64 bits that is a unique to the node and therefore does not need to be programmed at manufacture. The coordinator 20 and all gateway routers 10 will be addressed by their long addresses. For routing, the coordinator 20 can be addressed using the address 0x0000000000000001 and the computer system 50 can be addressed using the address 0x0000000000000002.

The length of the beaconing interval 61, and the number and timing of the timeslots 60 is set by the coordinator 20. The length of the beaconing interval 61 is chosen to allow the number of gateway routers 10 and the length of the timeslots 60 (super frame duration) to fit. To avoid collisions between timeslots 60, gaps may be added therebetween.

The coordinator 20 may allocate the timeslots 60 as follows. The coordinator 20 allocates the initial timeslot 60 to itself. When a gateway router 10 requests association with the network 40, the coordinator 20 checks the timeslot 60 of its parent node and allocates the next free timeslot 60 thereafter.

Routing of messages may be implemented as follows. Each gateway router 10 stores a list of routes to other gateway routers 10 with the next hop address based on packets that have passed through it. The oldest routes will be dropped if the table overflows. Packets with a routing destination of 0x1 or 0x2 will be routed to the parent node of the node concerned. If the node is the coordinator 20, then packets addressed to 0x1 will be parsed and responded to and packets addressed to 0x2 will be routed to the computer apparatus 50. First the node sends a packet to 0x1 which will pass through the coordinator 20, and once this is done all the intermediate steps are known as the routing tables have been updated. Any packets with an unknown destination will be dropped.

If a gateway router 10 needs to change its parent it will stop broadcasting beacons immediately. It will then delay is to allow all its child gateway routers 10 to stop beaconing and then scan for a new parent node. Any child gateway routers 10 on this gateway router 10 will follow the same logic as soon as a gateway router 10 loses the beacon from its parent. Therefore if a gateway router 10 high up the network needs to change its parent the whole of the network under it will stop working for a period.

Packets on the network may have the following their structure.

MAC and security packet headers are set in accordance with the IEEE 802.15.4 technical standard.

Figure 8:
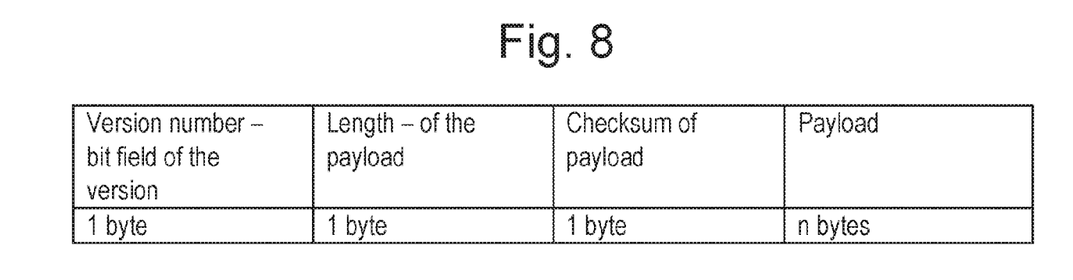
FIG. 8 is a diagram of a version header of a transmission packet.
Figure 9:
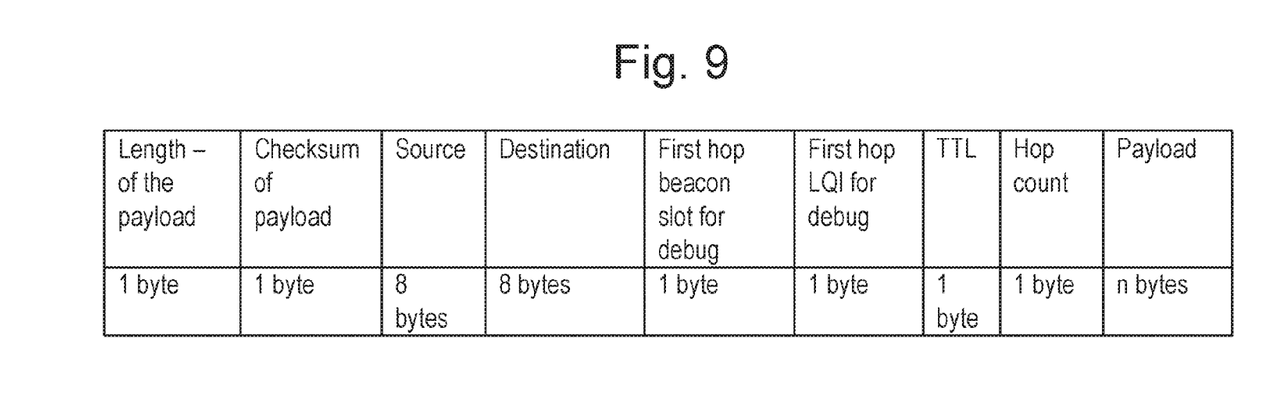
FIG. 9 is a diagram of a routing header of a transmission packet.

The version header takes the form shown in FIG. 8 and is placed in the packet, as the first three bytes of any message from the MAC layer, for either beacon payloads or data payloads If a packet is not part of a beacon payload, a routing header will be included. The routing header takes the form shown in FIG. 9 and includes data as follows. The length is used to allow more than one routing packet to be used per MAC packet. The length is all the bytes in the payload. The source is the source of the packet. The destination is the place to route the packet to. The hop count shall be incremented each hop. The TTL is the time to live which is decremented each hop. If this gets to zero the device will respond indicating the TTL expired. The first hop slot and LQI are filled in by the first device that routes the packet. The sending device sets the first hop to 0xFF to indicate it needs to be filled in on reception of the packet.

Figure 10:
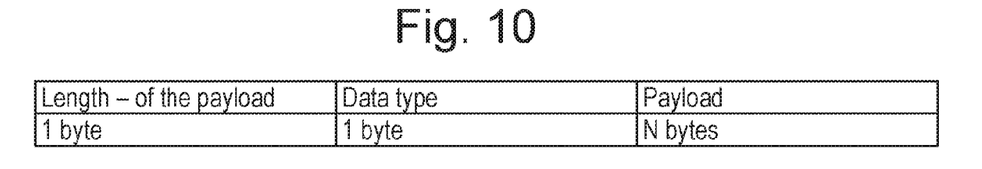
FIG. 10 is a diagram of a data header of a transmission packet.

The data header takes the form shown in FIG. 10. The data packet can be placed inside the device packet (device header) or directly in a broadcast.

Figure 11:
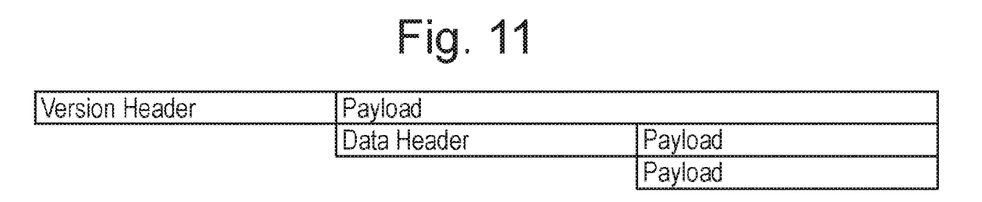
FIG. 11 is a diagram of a beacon frame structure.
Figure 12:
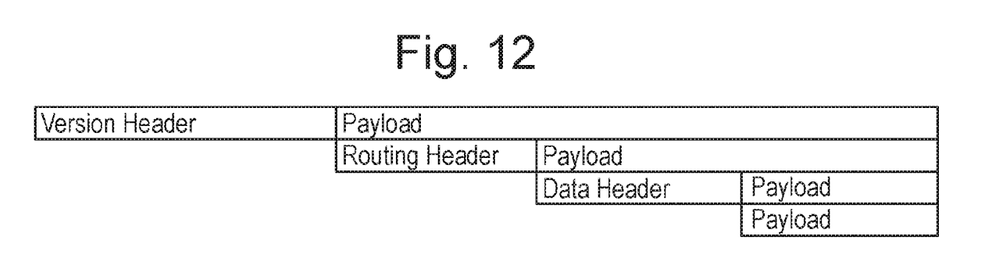
FIG. 12 is a diagram of a data frame structure.

A complete beacon frame structure is shown in FIG. 11, wherein the data section can be repeated multiple times A complete data frame structure is shown in FIG. 12, wherein the Data section can be repeated multiple times Messages are part of the data packet as set out above.

The coordinator 20 maintains a routing table based on last messages received from nodes. The routing table is limited to nodes received in the last 11 seconds, because all gateway routers 10 transmit messages to the coordinator 10 at least once every 5 seconds and all messages from end device 30 should be responded to in 1 second.

The gateway routers 10 maintains a routing table based on last messages received from nodes that are associated to them as child nodes. This routing table is limited to nodes received in the last 11 seconds which will include any child gateway routers 10 and all messages from end device 30 should be responded to in 1 second.

The end devices 30 do not maintain a routing table, because they do not route messages. All messages are addressed to the coordinator 10 via the parent node from which it last received a beacon message.

By way of non-limitative example, the sensor unit 31 may sense the rotational position of a rotatable element. In that case the end device 31 may generate messages indicating the sensed rotational position.

Figure 13:
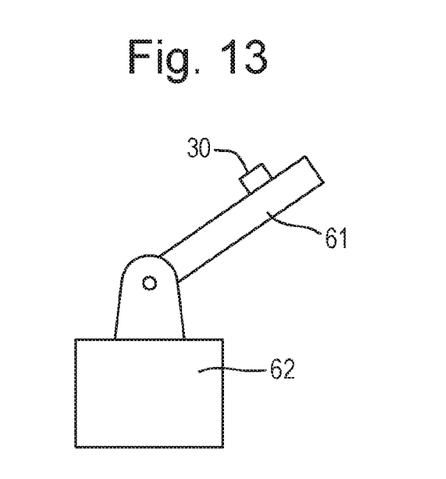
FIG. 13 is a side view of an end device mounted on a rotatable element.

The end devices 30 may be mounted on a rotatable element. In that case, the sensor unit 31 may comprise an orientation sensor that takes measurements that are dependent on the orientation of the sensor unit. Such measurements allow for a simple and reliable detection of the rotational position of the rotatable element. FIG. 13 shows an example of an end device 30 mounted on a element 60 that is rotatably mounted on a bracket 61 but this is not limitative and the sensor unit 20 may be mounted on a wide range of types rotatable elements 2.

Where the sensor unit 31 comprises an orientation sensor orientation sensor 18 that takes measurements that are dependent on the orientation of the end device 30, in general, the orientation sensor 18 may be any type of sensor suitable for that purpose, but may preferably be a low power sensor such as a MEMS sensor, which may be for example configured as an inclinometer, accelerometer, magnetometer or gyroscope. Examples of alternative types of sensor that could be used include: tilt ball sensor; infrared; laser; optical, digital imaging, acoustic; capacitive; magnetic, antenna polarisation or Hall Effect sensors. The sensor unit 31 may further include a processor 52 which processes measurements supplied from the orientation sensor to derive a rotational position signal representing the rotational position of a rotatable element, for example by representing the absolute value of the rotational position across the range of movement or simply representing that the rotational position of the rotatable element 5 is one of plural states. The sensor unit 31 may be arranged as described in more detail in International Patent Application No. PCT/2017/052494, to which reference is made.

Non-limitative examples of rotatable elements which the sensor unit 31 may sense include:

hatches, handles, wheels or watertight doors used to provide marine integrity of compartments around a vessel, so as to monitor their position and condition to demonstrate the vessel is secure;

wheel valves in a marine application, or any other engineering application;

valves or pressurised lines (e.g. hydraulic, pneumatic) in applications where monitoring of position and other aspects like pressure, flow and temperature may be critical;

hinges, gates, doors, shutters and/or brackets, feedback on whose orientation or status may be required for integrity or safety monitoring;

elevators used to handle pipe which may become misaligned between their top and bottom rails;

latches of fingerboard latch assemblies;

claws used to clamp or secure tubulars during pipe handling operations, to ensure position (open/closed state) is known, and to monitor other characteristics such as strain, vibration and temperature;

clamps used to secure large, heavy pieces of equipment such as blow out preventers, skids, trucks, dollies or pumps;

bails used to hold tubulars in the draw-works or top drive;

cranes, or arms of cranes, to provide feedback on orientation and to monitor for safe operation and/or operation within design parameters, e.g. lifting loads in high seas;

container brackets and/or doors, to provide data on security and integrity of cargo;

draw-works, crown, top-drive or blocks used to apply load and torque to tubulars while drilling, so as to monitor their condition and position, vibration, oscillation, wear and temperature;

straps, slings or brackets used to lift loads, or secure objects, to monitor them for orientation, vibration or oscillation and provide an alarm or feedback in the event of unsafe operation, dangerous conditions, excessive sway, fraying of straps or loads exceeding specified mass, e.g. integration of a monitoring device to monitor orientation of straps while lifting or securing loads;

load cells or strain gauges;

hull monitoring, crack detection, corrosion monitoring;

jacks, racks, rails, rotors, bearings or seals.

Other variations are possible. The end device 30 may include a further sensor which may in general be any type of sensor that is used to monitor another characteristic of the rotatable element to be monitored in parallel with its rotational position. Alternatively, the end device 30 may include a sensor unit 31 that senses any parameter other than rotational position, or may be a type of device that does not include the sensor unit 31.

As previously mentioned the end device 30 includes a power source 37, which may be a battery or more generally any type of standalone power source known in the art that is capable of providing power to the sensor unit 10 may be provided. For example the power source may comprise a battery, solar cell, fuel cell, supercapacitor or capacitor. The power source may optionally comprise an energy harvesting device that is configured to harvest energy from the surroundings, such as an assembly on which the end device 10 is mounted or from electromagnetic sources. For example the power source 37 may be configured to harvest energy from the motion, shock or vibration of a rotatable element on which the end device 10 is mounted. The power source 37 may be provided integral with the end device 30, or removably attached thereto.

In an example where the power source 37 is a battery, preferably the battery has long life characteristics. The battery is ideally compact in format to fit within the end device 30. Optionally, the battery may be a Lithium Thionyl Chloride battery that has been selected and configured to last the lifetime of the equipment.

The invention claimed is:

1. A wireless network comprising a plurality of nodes including plural routers and plural end devices, which nodes each include a wireless interface for wireless communication, the nodes of the network being arranged to communicate in accordance a network protocol, in accordance with which:
the routers transmit beacons in respective timeslots within a periodic beaconing interval, passively scan for messages, and, in response to receiving a message, transmit an acknowledgement of the received message; and
when an end device has a message that is pending transmission, the end device (a) passively scans for beacons transmitted from any router; and (b) in response to receiving a beacon, transmits the message, and passively scans for an acknowledgement, the end device repeating steps (a) and (b) if no acknowledgement is received.

2. The wireless network according to claim 1, wherein, in accordance with the network protocol, the routers passively scan for messages in the respective timeslot of their own beacon, and the end device transmits the message in the timeslot of the received beacon.

3. The wireless network according to claim 2, wherein, in accordance with the network protocol, the routers transmit an acknowledgement of the received message in the timeslot of their own beacon, and the end device passively scans for an acknowledgement in the timeslot of the received beacon.

4. The wireless network according to claim 1, wherein the routers include a coordinator and plural gateway routers, wherein, in accordance with the network protocol, the gateway routers transmit messages they receive to the coordinator.

5. The wireless network according to claim 1, wherein, in accordance with the network protocol:
the coordinator transmits a beacon in an initial timeslot;
each gateway router passively scans for a beacon transmitted from another router, and transmits a beacon in its respective timeslot only in response to receiving a beacon with a predetermined period prior thereto.

6. The wireless network according to claim 5, wherein, in accordance with the network protocol, in response to a determination that radio silence is required, the coordinator is arranged not to transmit a beacon in the initial timeslot, whereby the gateway routers are caused also not to transmit beacons.

7. The wireless network according to claim 4, wherein, in accordance with the network protocol, the routers have a tree-shaped communication topology comprising a first layer of gateway routers that are each associated to the coordinator and optionally one or more further layers of gateway routers that are each associated to a gateway router in a lower layer.

8. The wireless network according to claim 7, wherein, in accordance with the network protocol, the gateway routers transmit messages they receive to the router to which they are associated.

9. The wireless network according to claim 7, wherein, in accordance with the network protocol, when a gateway router has a message that is pending transmission, the gateway router, in response to receiving a beacon from the router to which it is associated, transmits the message in the timeslot of the received beacon, and passively scans for an acknowledgement, the gateway router repeating that transmission if no acknowledgement is received.

10. The wireless network according to claim 7, wherein each gateway router passively scans for a beacon transmitted from the router to which it is associated, and transmits a beacon in its respective timeslot only in response to receiving a beacon from the router to which it is associated within a predetermined period prior thereto.

11. The wireless network according to claim 1, wherein, in response to a determination that radio silence is required, the routers are arranged not to transmit beacons.

12. The wireless network according to claim 1, wherein the end devices do not passively scan for beacons except when they have a message that is pending transmission, and optionally also at predetermined times for reception of a downstream message.

13. The wireless network according to claim 1, wherein the end devices each include a sensor unit for sensing the rotational position of a respective rotatable element, and are arranged to generate messages indicating the sensed rotational position.

14. The wireless network according to claim 13, wherein the end devices are each mounted on the respective rotatable element.

15. A method of communication between nodes of a wireless network, including plural routers and plural end devices, which nodes each include a wireless interface for wireless communication, the method comprising:
the routers transmitting beacons in respective timeslots within a periodic beaconing interval, passively scanning for messages and, in response to receiving a message, transmitting an acknowledgement of the message; and
when an end device has a message that is pending transmission, the end device (a) passively scanning for beacons transmitted from any router; and (b) in response to receiving a beacon, transmitting the message, and passively scanning for an acknowledgement, the end device repeating steps (a) and (b) if no acknowledgement is received.

16. An end device for use as a node in a wireless network further comprising plural routers, the end device including a wireless interface for wireless communication with the routers, wherein the end device is arranged, when it has a message that is pending transmission, (a) to passively scan for beacons transmitted from any router in respective timeslots within a periodic beaconing interval; and (b) in response to receiving a beacon, to transmit the message, and to passively scan for an acknowledgement, the end device being arranged to repeat steps (a) and (b) if no acknowledgement is received.

\* \* \* \* \*